F. S. ELLETT.
TWO-SPEED GEAR FOR MOTOR CYCLES.
APPLICATION FILED JAN. 2, 1914.
1,149,901. Patented Aug. 10, 1915.
2 SHEETS—SHEET 1.
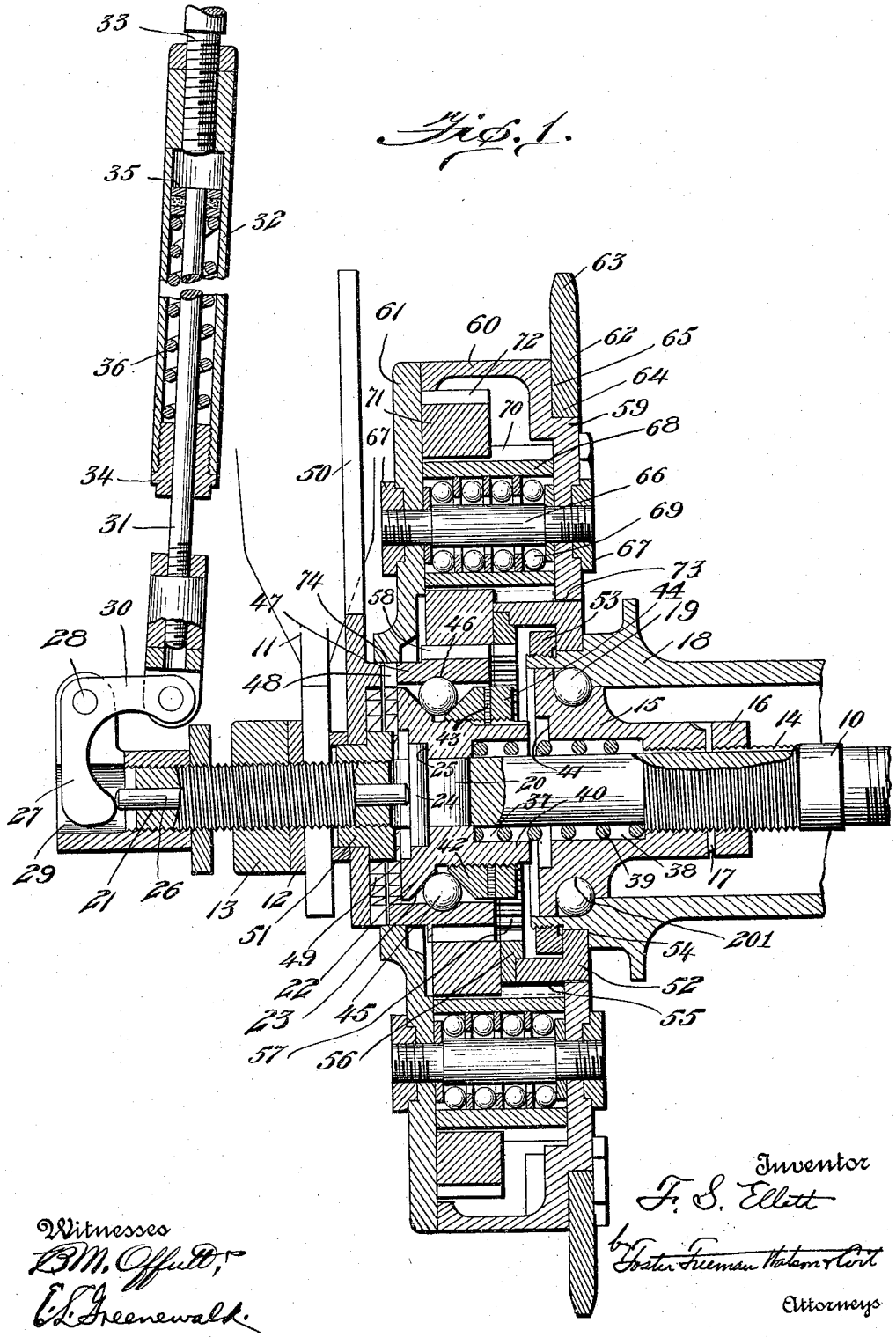

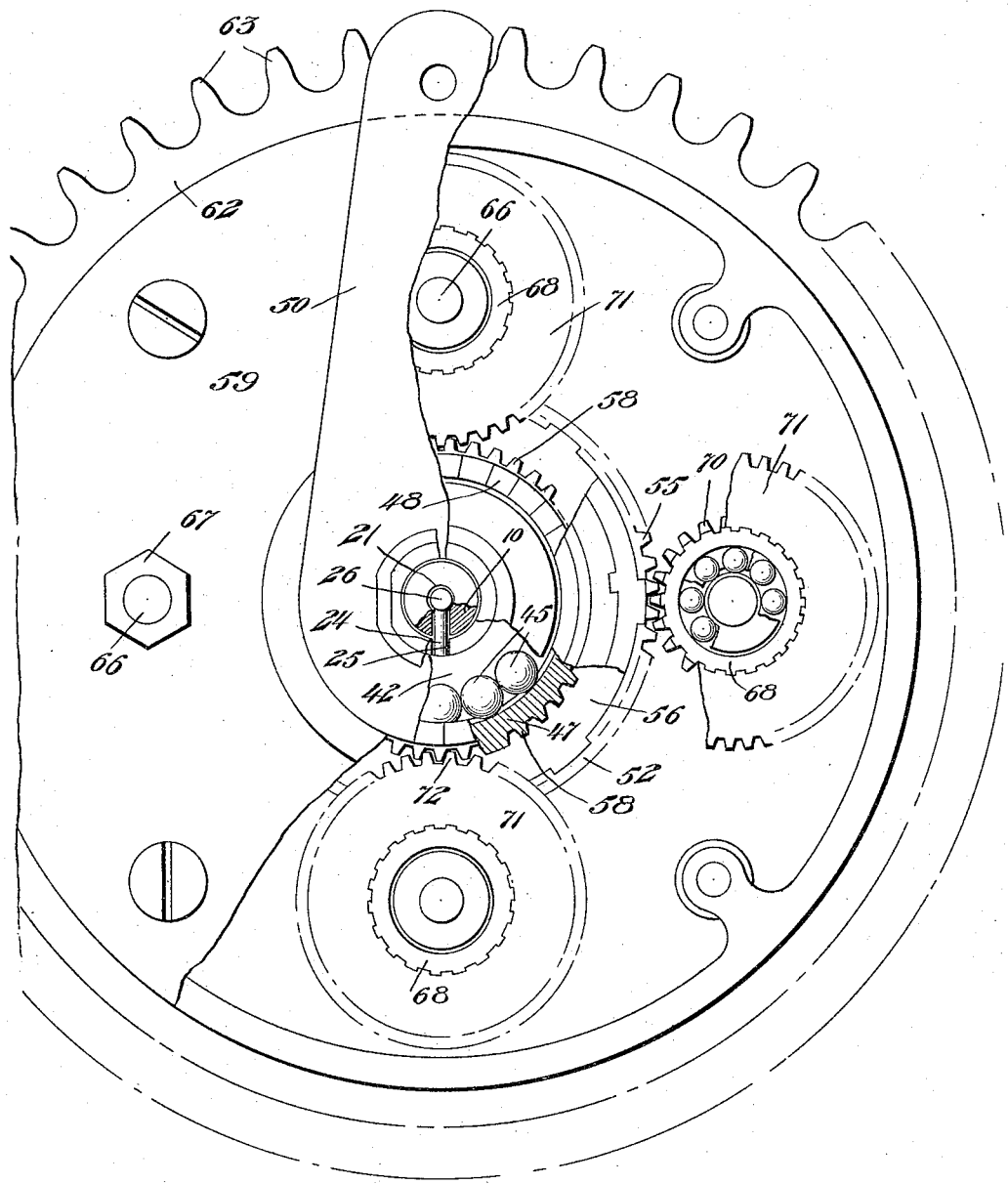

UNITED STATES PATENT OFFICE.

FREDERICK S. ELLETT, OF ELMIRA, NEW YORK.

TWO-SPEED GEAR FOR MOTOR-CYCLES.

1,149,901.　　　　　　Specification of Letters Patent.　　Patented Aug. 10, 1915.

Application filed January 2, 1914.　Serial No. 810,024.

*To all whom it may concern:*

Be it known that I, FREDERICK S. ELLETT, a citizen of the United States, and resident of Elmira, county of Chemung, State of New York, have invented certain new and useful Improvements in Two-Speed Gear for Motor-Cycles, of which the following is a specification.

This invention relates to change-speed mechanism and more particularly to a two-speed gear for motorcycles and other motor vehicles.

The principal object of my invention is to provide a simple compact device which will fit the greatest number of machines now on the market and require the least possible expense in fitting the same thereto.

Another object is to provide a gear in which by a simple operation the gear may be changed from neutral or idle position to high speed or low speed.

Another object is to provide a device in which there are no working or moving joints at the outer periphery of the device so that the oil or grease will not readily work outwardly as is the case in a great many of the devices now on the market.

The above and other objects and the novel features of the invention will be apparent from the following description, taken in connection with the drawing, in which—

Figure 1 is a longitudinal cross-sectional view of the device assembled on the frame of a motorcycle. Fig. 2 is a side elevation of the device, parts being broken away to disclose features on the interior.

Referring to the drawing, 10 designates an axle or shaft which is stationary and supported at its opposite ends in the frame 11, the rear fork of the motorcycle frame for instance, only one end of the shaft being shown in the illustration.

A washer 12 and a lock nut 13 having threaded engagement with the outer threaded end of the shaft clamp against the frame on one side to prevent the inward movement of the shaft.

On opposite sides of its center, the shaft 10 is threaded as at 14 to engage the threads on the interior of the cone 15, and the lock nut 16 secures the latter in place.

A lock washer 17 placed between the lock nut 16 and cone 15 also serves to prevent the displacement of the cone.

It will be understood that there are two cones 15 in symmetrical positions on the shaft 10 which support a hub 18 at its ends.

The series of balls 19 in the raceway 201 of the hub serve to provide an antifriction bearing between the cones 15 and hub 18, and support the latter.

The shaft 10 has an elongated cross-slot 20 which is disposed between the threaded portion 14 and where the shaft passes through the frame member 11. The cross-slot 20 extends diametrically across the shaft 10 and a central longitudinal slot 21 in the shaft extends from the outer end of the shaft 10 and opens into the cross-slot 20.

A sliding gear supporting member 22 is carried by the shaft 10 in juxtaposition to the slot 20 and has a beveled outer part 23. The supporting member 22 is keyed to the shaft 10 by means of a cross-pin 24 which extends through the slot 20 and beyond the same, the ends thereof fitting in notches 25 on diametrically opposite sides of the supporting member 22.

A long pin 26 extends through the slot 21 and at its inner end engages the cross-pin 24 so that when it is operated it will shift the sliding gear carrying member 22 to the right in Fig. 1 of the drawing. The outer end of the pin 26 is engaged by the arm 27 of a double-arm lever pivoted at 28 on the bracket 29, carried by the outer end of the shaft 10, and having threaded engagement therewith. The other arm 30 of the double-arm lever pivoted at 28 has a piston rod 31 connected thereto, which works in a cylinder 32 carried by the operating rod 33, which latter is mounted in and secured to one head of the cylinder 32. Between the other head 34 of the cylinder 32 and the piston 35, there is a spiral spring 36 which forms a yieldable connection between the operating rod 33 and the rod 31 pivoted to the arm 30. The end of the rod 33 is extended so as to be accessible to the operator of the vehicle.

Annular cavities 37 and 38 are formed in the opposing faces of the supporting member 22 and the cone 15 to receive the ends of a spiral spring 39 which tends to force the member 22 along the shaft to the left in Fig. 1, when the operating arm 27 is pushed to the right, and allows the pin 26 to move longitudinally in the slot 21.

The supporting member 22 has a reduced portion 40, the end of which extends into an annular recess 41 in the opposing face of the cone 15. The reduced portion 40 is also threaded for a portion of its length to receive an interiorly threaded cone 42 which is locked in place by a washer 43 and nut 44. The cone 42 and the conical surface 23 together form a raceway for the series of balls 45, which fit in a concave raceway 46 on the inner side of a sliding gear 47. In this arrangement the gear 47 rotates independently of the supporting member 22 but is locked to the latter so that they will move together along the shaft in either direction.

The outer lateral face of the sliding gear has a series of clutch teeth 48 adapted to mesh with the clutch teeth 49 on the inner lateral face of the clutch lever or anchor 50. The sliding gear will be clutched by the lever 50 when the spring 39 shifts the supporting member 22 and the gear 47 carried thereby to the extreme position at the left. The operating arm 27 is swung to the left so as to permit the pin 26 to move outwardly until its inner end is flush with the inner end of a sleeve 51, the latter pivotally supporting the clutch lever 50 on the shaft 10.

An annular member 52, L-shaped in cross-section, is clamped by the threaded locking ring 53 against a shoulder 54 near the end of the hub 18, and is fast on the said hub so as to rotate therewith. The member 52 is provided with teeth 55 on its periphery. An annular member 56 provided with teeth 57 on its interior face is interlocked with the outer end of the member 52. Together the members 52 and 56 form a gear on the end of the hub which has interior and exterior teeth. When the operating arm 27 is shifted to the right in Fig. 1, so as to move the supporting member 22 and sliding gear 47 to the right, the teeth 58 of the sliding gear will mesh with the interior teeth 57 of the hub gear and the hub will be driven directly from the driving sprocket hereinafter described.

It will be noticed that when the gear is in the direct or high speed driving position that the end of the gear supporting member 22 abuts against the end face of the stationary cone 15. The object of this arrangement is to relieve the gear carrying balls 45 of thrusts.

An inclosing casing is provided for the gearing which comprises the casing proper having the side wall 59 and the peripheral wall 60 cast in one piece and the cover or opposite side wall 61.

An annular plate 62 having a series of sprocket teeth 63 at its outer edge and lugs 64 at its inner edge to secure the same to the casing wall 59 fits in a groove 65 at the outer edge of the casing. The teeth 63 are adapted to engage a sprocket chain driven by the engine or other suitable means and constitutes the driving member of the mechanism. The cover 61 is clamped to the casing by means of a series of four bolts 66, spaced 90° apart around the casing. The bolts 66 extend through the cover 61 and wall 59 and are secured at their outer ends by means of the nuts 67 which are locked in recesses in the cover 61 and wall 59 respectively.

A sleeve 68 surrounds each bolt 66 and is separated therefrom by means of the ball bearings 69. The sleeve 68 has a series of gear teeth 70 on its exterior surface which gear teeth are always in mesh with the gear teeth 55 on the hub gear.

A large gear 71 surrounds and is keyed to the sleeve 68 so that it will rotate with the smaller gear integral with the sleeve.

The gear 71 has teeth 72 which are always in mesh with the teeth 58 of the sliding gear 47.

The four pairs of idler gears supported on the ball bearings serve to support and act as bearings for the case itself, running joints at 73 and 74 constituting the connection between the casing and the hub and sliding gear respectively.

The operation of the gear will be apparent from the foregoing description.

Fig. 1 shows the gear in neutral or idle position. In order to throw the gear into high or direct drive, the operating arm 27 is moved to the right which movement is transmitted through the pins 26 and 24 to the supporting member 22 and sliding gear 47 causing the teeth 58 on the latter to move over into engagement with the interior teeth 57 on the hub, thus transmitting the direct drive from the sprocket teeth 63 to the hub 18. In order to throw the gear into low speed, the operating rod is pushed in a backward direction or toward the axle which allows the coiled spring 39 to thrust the gear carrying member 22 to the left causing the teeth 48 of the gear 47 to engage the teeth 49 of the clutch arm 50. By holding the sliding gear stationary, the low gear is thrown into action and the drive is communicated from the sprocket teeth 63 to the hub 18 through the teeth 70 on the small idler gears which mesh with the teeth 55 of the hub gear.

It will thus be seen that when the sliding gear is at the extreme right, the sprocket wheel will drive the hub directly. When the sliding gear is at the extreme left and locked against rotation by the clutch lever 50, the reducing gear having the teeth 70 will be interposed and the sprocket wheel will drive the hub at a slower speed through the exterior teeth on the hub gear. When the sliding gear is in intermediate position as shown in Fig. 1, there will be no transmission from the sprocket wheel to the hub.

The device illustrated on account of its compactness and simplicity, is particularly adapted for use on motorcycles and is designed to fit most machines now on the market. It is also arranged so that the working or moving joints are close to the axis to keep the lubrication from working out of the gear casing at any point in the periphery as is common in many devices now on the market.

While I have shown a particular embodiment of my invention, I do not wish to be limited to the exact details as shown and member and meshing with the loose gear and other row of teeth on the hub.

6. The combination of a driving member, a driven member, a plurality of pairs of gears rotatable bodily with said driving member, means having inner and outer toothed surfaces carried by said driven member, one of each of said pairs of gears meshing with the outer toothed surface carried by the driven member, and an axially movable device for coupling the other of each of said pairs of gears to the inner toothed surterior teeth, a driving member, a gear casing to which the driving member is secured, pairs of gears mounted in the gear casing and rotatable with said driving member, one of each of said pairs of gears meshing with the exterior teeth on said annular member, and means for coupling the other of each of said pairs of gears to the interior teeth of the annular member, comprising a sliding gear having clutch teeth, a clutch lever having teeth interlocking with the clutch teeth of the sliding gear, means for supporting the sliding gear, said supporting means having slots to receive the ends of the cross-pin whereby the supporting means is keyed to the shaft, a spring tending to shift the supporting means and sliding gear in one direction to move the latter out of mesh with the teeth on the annular member, and the clutch teeth thereof into mesh with the teeth on the clutch lever, and an operating lever for moving the pin in the longitudinal slot to hold the sliding gear in neutral position or shifting the same into mesh with the annular member on the hub.

10. The combination of a non-rotatable shaft, a hub rotatably mounted on said shaft and provided with teeth, a driving member, a loose gear carried by the shaft and adapted to mesh with teeth on the hub, and gearing movable with the driving member, rotatable independently thereof and meshing with the loose gear and with teeth on the hub.

11. In a motorcycle, the combination of a non-rotatable shaft, a hub having teeth thereon, means for rotatably supporting said hub comprising a cone fast on said shaft, a driving member, a loose gear, supporting means therefor movable longitudinally of the shaft and adapted to abut against one end of the cone when said loose gear meshes with the teeth on the hub, and gearing movable with the driving member, rotatable independently thereof and meshing with the loose gear and teeth on the hub.

12. In a motorcycle or the like, the combination with a non-rotatable shaft, of a driving member and a driven member mounted thereon, said members having gear teeth thereon, means for gearing said driving member to said driven member comprising gear teeth mounted on the driving member and meshing with gear teeth carried by the driven member, a gear meshing with certain of the gear teeth on the driving member and slidable along said shaft, said slidable gear and driven member being capable of clutching the slidable gear to the driven member when said gear is moved axially in one direction, means whereby said slidable gear may be held against turning, and means for operating said slidable gear.

In testimony whereof I affix my signature in presence of two witnesses.

FREDERICK S. ELLETT.

Witnesses:
A. C. RICE,
D. H. CANFIELD.

Copies of this patent may be obtained for five cents each, by addressing the "Commissioner of Patents, Washington, D. C."